United States Patent
Oglesbee et al.

(10) Patent No.: US 6,667,606 B2
(45) Date of Patent: Dec. 23, 2003

(54) POWER REGULATION AND THERMAL MANAGEMENT CIRCUIT

(75) Inventors: John Wendell Oglesbee, Watkinsville, GA (US); Chris Hanchana Thongsouk, Alpharetta, GA (US); Robert Michael Johnson, Jr., Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 122 days.

(21) Appl. No.: 10/077,355

(22) Filed: Feb. 15, 2002

(65) Prior Publication Data

US 2003/0155899 A1 Aug. 21, 2003

(51) Int. Cl.[7] .............................. G05F 1/40; G05F 1/56
(52) U.S. Cl. ........................................ 323/284; 323/274
(58) Field of Search ................................. 323/268–279, 323/282, 284, 285, 907; 320/126, 134, 135, 136, 149, 150, 152, 153, 162, 163, 164

(56) References Cited

U.S. PATENT DOCUMENTS

| | | | |
|---|---|---|---|
| 4,315,209 A | | 2/1982 | Schmoock |
| 4,847,547 A | | 7/1989 | Eng |
| 4,885,522 A | * | 12/1989 | Konopka .................... 320/145 |
| 5,023,541 A | | 6/1991 | Yosinski |
| 5,451,857 A | | 9/1995 | Moe |
| 5,703,470 A | | 12/1997 | Baranowski et al. |
| 5,744,939 A | * | 4/1998 | Leppo |
| 5,815,382 A | | 9/1998 | Saint-Pierre et al. |
| 6,441,594 B1 | * | 8/2002 | Connell et al. ............. 323/274 |
| 6,492,792 B1 | * | 12/2002 | Johnson et al. ............. 320/136 |
| 6,559,623 B1 | * | 5/2003 | Pardoen ...................... 323/274 |

* cited by examiner

Primary Examiner—Matthew V. Nguyen
(74) Attorney, Agent, or Firm—Philip H. Burrus, IV (57) ABSTRACT

This invention provides a means of protecting power dissipating pass elements from exceeding their predetermined thermal limits. In one preferred embodiment, the circuit protects a pass element in a battery charging circuit from exceeding its threshold junction temperature by predicting temperature based upon the voltage across the pass element and the current flowing through it. From this predicted temperature, current is reduced to provide charging of a battery at a constant power. The circuit includes a voltage sensing circuit and a plurality of comparators for selecting a predetermined current based upon the output of the voltage sensing circuit. The circuit provides a piecewise linear approximation of proper pass element voltage and current values to maintain a suitable threshold junction temperature.

16 Claims, 6 Drawing Sheets

POWER REGULATION AND THERMAL MANAGEMENT CIRCUIT

BACKGROUND

1. TECHNICAL FIELD

This invention relates generally to thermal regulation circuits for power dissipating electronic circuit elements, and more specifically to power regulation and thermal management for power transistors as, for example, in battery charging applications.

2. BACKGROUND ART

Figure 1:
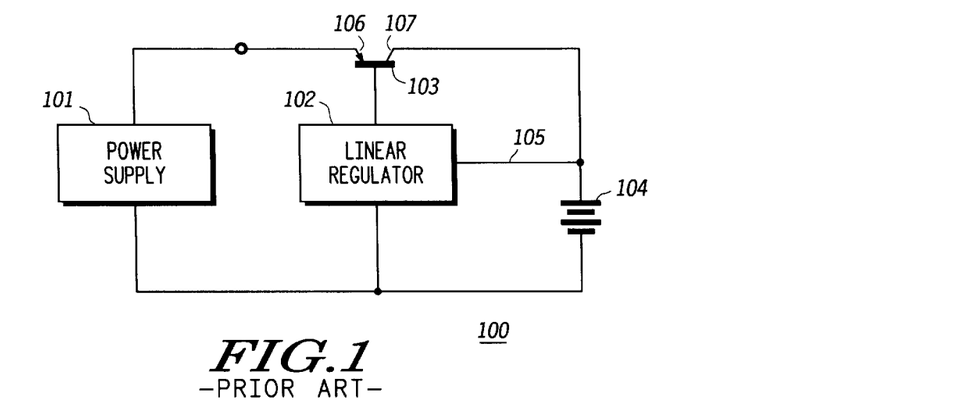
FIG. 1 is an illustration of a prior art charging circuit.

FIG. 1 illustrates a simple battery charger 100 that is well known in the art. The charger 100 consists of a power supply 101, a linear regulator 102, a pass element 103 and a battery cell 104. The power supply 101 provides voltage and current to the battery cell 104. The voltage and current must be regulated by the pass element 103 so as to avoid charging the battery cell 104 too rapidly. The linear regulator 102 performs this regulation by dissipating as heat the difference between the power generated by the power supply 101 and the power stored by the battery cell 104.

The problem with this prior art solution is that the pass element 103 can overheat. This is best explained by way of example. For a typical single-cell, lithium battery application, a fully charged battery cell 104 typically registers about 4.1 volts. Thus, to fully charge the battery cell 104, and to give enough headroom for parasitic power losses in the pass element 103 and connecting circuitry, the power supply must be capable of supplying at least 5 volts. A typical battery cell 104 will charge optimally at a current of roughly 1 amp.

The problem arises with the battery cell 104 is fully discharged. A discharged battery cell 104 may register only 2 volts. As the power supply 101 would supply energy at a rate of 5 volts at 1 amp, or 5 watts, and the battery cell 104 stores energy at a rate of 2 volts at 1 amp, or 2 watts, the pass element 103 must dissipate energy at a rate of 3 watts. As typical pass elements 103 may come in a TO-220 package, 3 watts for extended periods of time may make the pass element 103 quite warm. Extended periods of heat my actually jeopardize reliability by approaching—or surpassing—the threshold junction temperature of the pass element 103.

The problem is exacerbated when an incompatible power supply 101 is coupled to the circuit. For example, if someone accidentally couples a 12-volt supply to the charger, the pass element 103 may have to dissipate 10 watts! This can eventually lead to thermal destruction of the pass element 103.

One solution to this problem is recited in U.S. Pat. No. 5,815,382, issued to Saint-Pierre et al. entitled "Tracking Circuit for Power Supply Output Control". This solution provides a means of reducing the output voltage of a power supply when the battery is in a discharged state, thereby reducing the total output power of the power supply. This, in turn, reduces the amount of power a pass element would need to dissipate.

While this is a very effective solution to the problem, it requires a power supply that both includes a feedback input and is responsive to the input by changing the output voltage. The electronics associated with an adjustable power supply can be more expensive that those found is a simple linear transformer power supply.

There is thus a need for an improved means of regulating temperature in a power-dissipating element like those employed as pass elements in battery charging applications.

DETAILED DESCRIPTION OF THE INVENTION

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise the meaning of "a," "an," and "the" includes plural reference, the meaning of "in" includes "in" and "on."

Prior to turning to the specifics of the invention, it is well to briefly examine the operating regions in which there is a risk of thermal damage to a pass element. This is best explained by looking at battery charging applications, although it will be obvious to those of ordinary skill in the art that the invention may be equally applied to other applications as well.

Figure 2A:
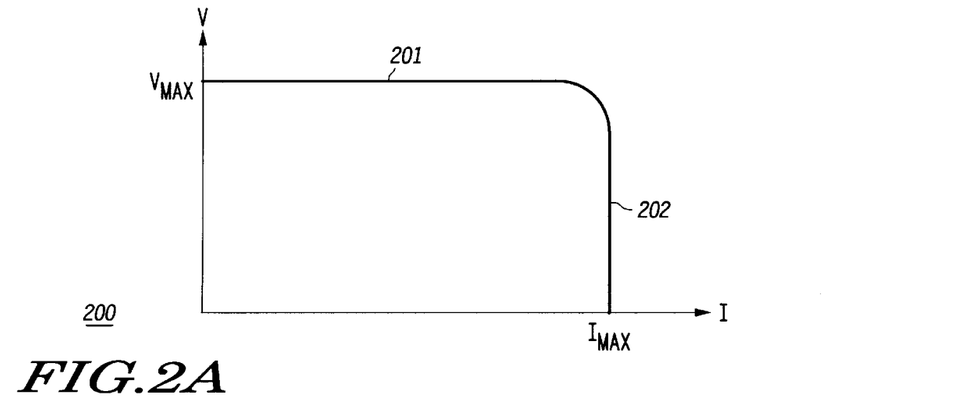
FIG. 2A is an illustration of the characteristic output of a constant current, constant voltage power supply.

Referring now to FIG. 2A, illustrated therein is the output characteristic 200 of a "constant-voltage-constant-current", or "CCCV", power supply. Such supplies are known in the art, as recited by U.S. Pat. No. 5,023,541, entitled "Power Supply Control Circuit Having Constant Voltage and Constant Current Modes". Another such supply is taught in the application notes for the TL494 control IC manufactured by On-Semiconductor. Segment 201 illustrates a constant voltage of Vmax that is supplied for all load currents less than Imax. Once the load current attempts to exceed Imax, segment 202 represents the maximum current, Imax, that is delivered as the voltage tapers from Vmax to zero.

Figure 2B:
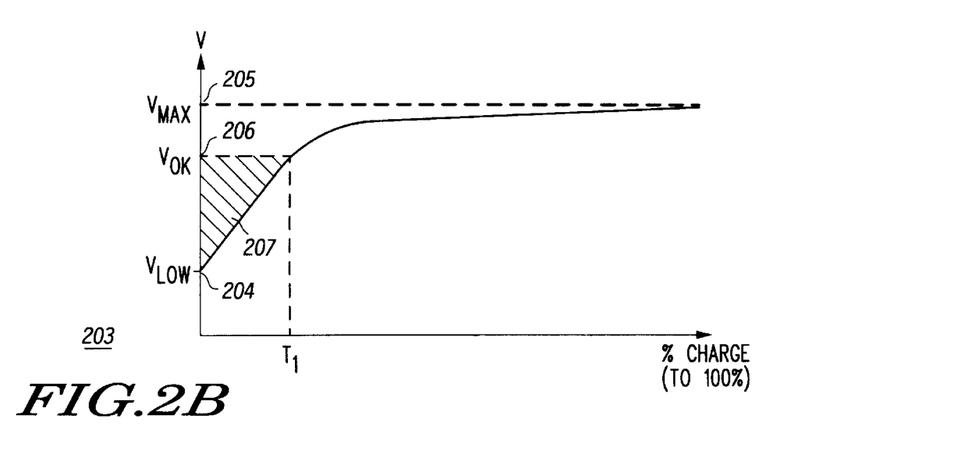
FIG. 2B illustrates a danger zone of operation in accordance with the invention.

Referring now to FIG. 2B, illustrated therein is a charging characteristic 203 of the circuit of FIG. 1 when a CCCV source is employed as the power supply. The characteristic 203 is represented as voltage versus percentage of charge. Presuming that an initially discharged battery cell is coupled to the supply, the charging curve begins at Vlow 204, which essentially represents the voltage of the discharged battery cell. The power supply, by contrast, begins at Vmax 205. Consequently, there is a difference Vmax 205 minus Vlow 204 that proportionally corresponds to the power that must be dissipated by the pass element. Experimental and theoretical results have shown that a threshold exists, Vok 206, above which standard pass elements are capable of dissipating power for a given charge rate. However, when the battery cell voltage is below Vok 206, the pass element is called upon to dissipate more power than it can withstand. Thus, the shaded region 207 represents the "danger zone" for the pass element. Note that the current is below Imax for the voltage to be Vmax.

Figure 3A:
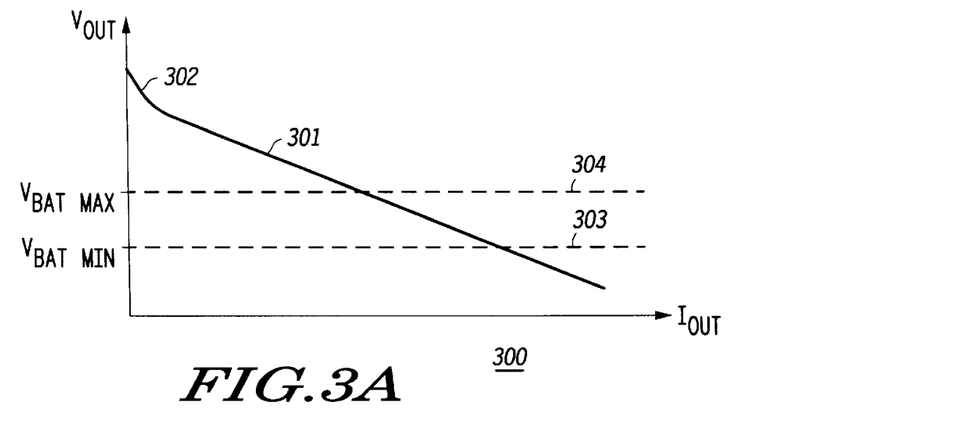
FIG. 3A is an illustration of the characteristic output of a wall transformer power supply.

Referring now to FIG. 3A, illustrated therein is the output characteristic 300 for another common power supply, the common linear transformer. It may be seen from segment 301 that voltage generally rolls off as current increases. A small peak at segment 302 may be caused by rectification circuitry that includes filter capacitors. In any event, the battery charges between the levels Vbatmin 303 and Vbatmax 304.

Figure 3B:
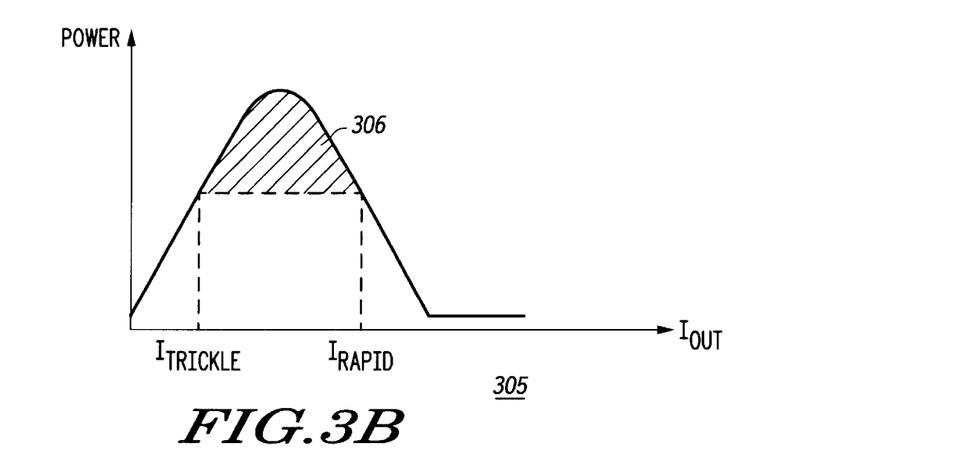
FIG. 3B illustrates a danger zone of operation in accordance with the invention.

Referring now to FIG. 3B, illustrated therein is the power generated by the circuit of FIG. 1 when a linear transformer is employed as the power supply. When the battery cell voltage approaches its termination point, Vbatmax 304 of FIG. 3A, the voltage of the transformer continues to increase while the battery voltage stays relatively constant. This means that the pass element must be able to dissipate the extra power that results from this increasing voltage differential. As a result of the extra power, a pass element danger zone for linear transformers exists in the shaded region 306.

To summarize the preceding discussion, there are regions of operation in which a battery charger having a pass element works well with no temperature compensation. There are other danger zones, however, where pass element reliability may be compromised. It is one object of this invention to provide a circuit that prevents pass elements or other power dissipating elements from entering danger zones.

Referring again to FIG. 1, the power dissipated in the pass element 103 may be expressed as the voltage of the power supply 101, minus the voltage of the battery cell 104, multiplied by the charge current. If the pass element 103 comprises a PNP bipolar junction transistor, as is common in the art, the voltage of the power supply 101, minus the voltage of the battery cell 104 may simply be represented as Vce, the voltage difference between the emitter 106 voltage and the collector 107 voltage. Thus, the power is given as:

$$P = Vce * Ichg \quad (EQ.1)$$

The threshold junction temperature, Tj, of the pass element 103 transistor is the temperature above which the transistor integrity begins to degrade. In other words, if the pass element 103 gets hotter than its threshold junction temperature, it will probably stop working properly. The threshold junction temperature may be represented as:

$$Tj = P*k + Tamb \quad (EQ. 2)$$

where P is the power dissipated in the pass element, k is a constant dependent upon the physical Thus, if the ambient temperature is 35 degrees C. and the threshold junction temperature is 150 degrees C, a power dissipation temperature of 115 degrees may be tolerated while still ensuring proper pass element operation.

Substituting EQ. 1 into EQ. 2 yields:

$$Tj = Vce*Ichg*k + Tamb \quad (EQ. 3)$$

Solving for Ichg yields:

$$Ichg = (Tj - Tamb)/(Vce*k) \quad (EQ. 4)$$

Figure 4:
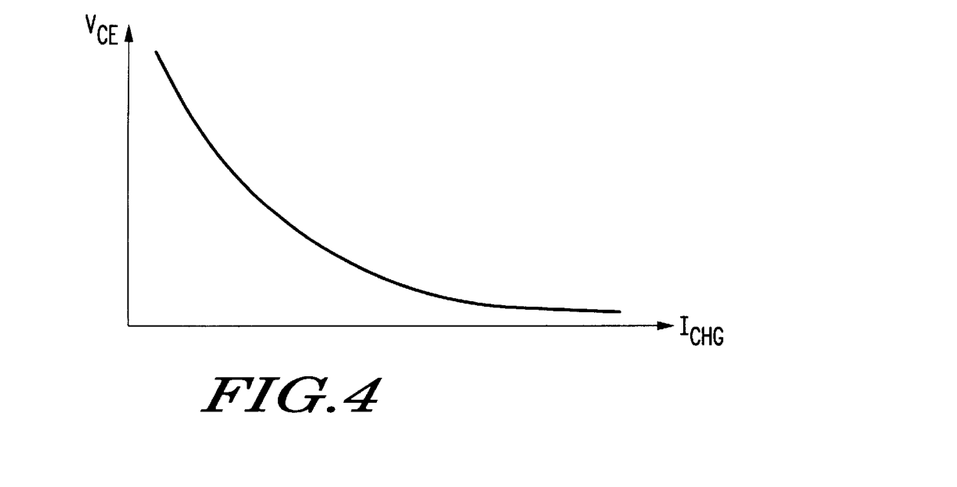
FIG. 4 is a plot of the voltage across a pass element versus the charge current in accordance with the invention.

Referring now to FIG. 4, illustrated therein is a plot of Vce versus Ichg. In this particular plot, Tj is presumed to be 150 degrees C. as this is common in transistors when used as power dissipating components. Additionally, Tamb is set at a maximum, for example 50 degrees C. as this presents a worst case (i.e. minimum) temperature rise allowed by power dissipation. It will be clear to those of ordinary skill in the art that any number of different plots could be generated by varying these assumptions to fit a particular application.

It is one object of this invention to keep the temperature of the pass element below the threshold junction temperature by reducing Ichg prior to the pass element entering a danger zone. In so doing, the invention provides a safeguard against component failure in battery charging applications.

Figure 5:
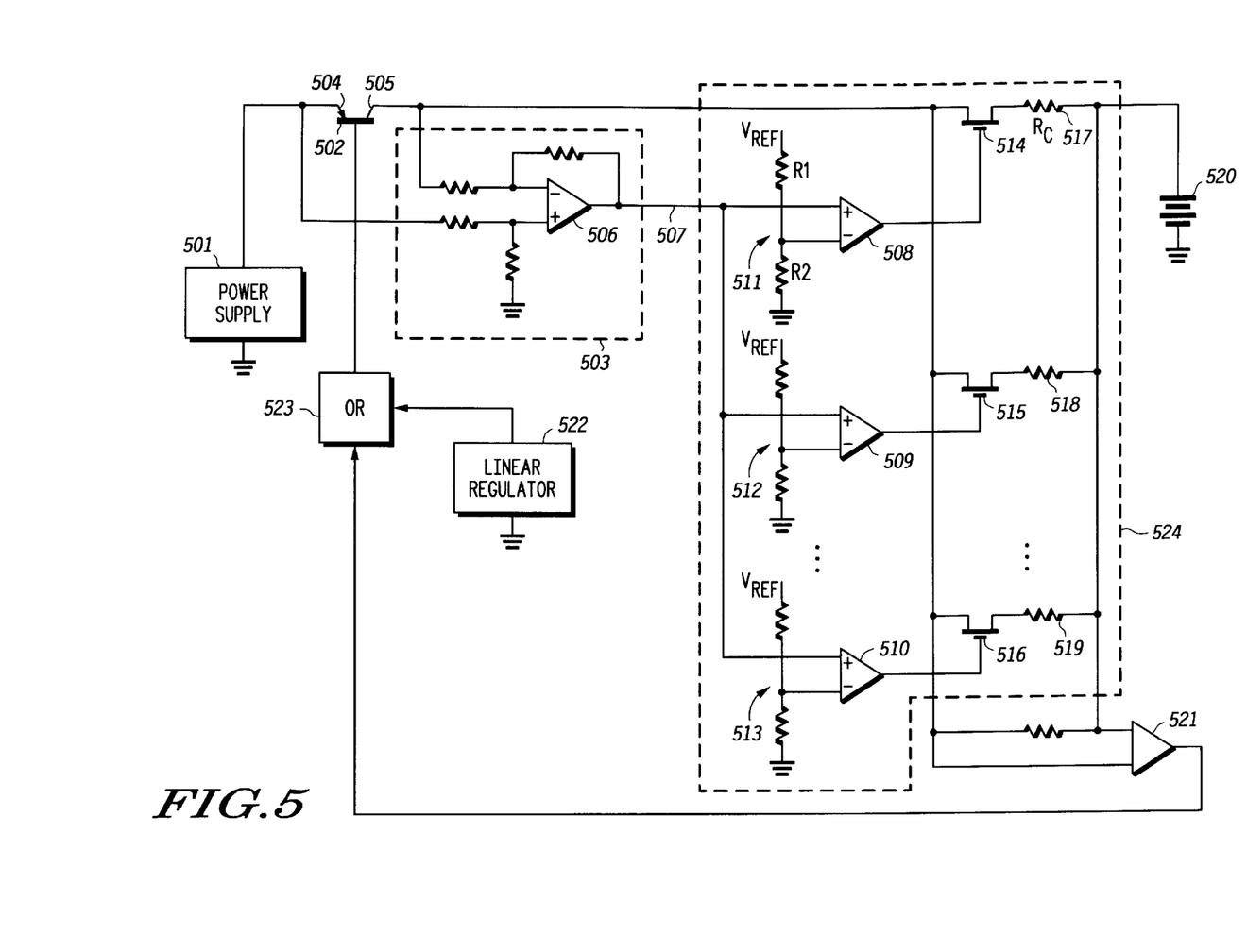
FIG. 5 is a schematic diagram of a preferred embodiment in accordance with the invention.

Referring now to FIG. 5, illustrated therein is one preferred embodiment of a power regulation and thermal management circuit in accordance with the invention. A power supply 501 provides power to the circuit. The power supply 501 may be any of a number of power supply types, including but not limited to CCCV and linear transformers. The power supply 501 is coupled to a pass element 502. In this preferred embodiment the pass element is a PNP bipolar junction transistor, although a large number of other types of pass elements may be substituted. The pass element 502 in this embodiment includes an emitter 504 and a collector 505.

A voltage sensing circuit 503 senses the voltage from collector 505 to emitter 504, Vce. In one preferred embodiment, the voltage sensing circuit includes an op-amp 506 with a preset gain. The voltage sensing circuit 503 delivers a voltage output 507 that is proportional to Vce. The voltage output 507 is coupled to a plurality of comparators 508,509,510, each having a distinct reference voltage 511, 512,513. The reference voltages 511, 512, 513 are easily set by resistor dividers. The number of comparators and corresponding reference voltages depends upon the resolution desired. It will be clear to those of ordinary skill in the art that the number of comparators may vary by application. It will also be obvious that the voltage references may be set in linear intervals, e.g. Vref, Vref*2, Vref*3, etc., as well as in non-linear intervals, e.g. Vref, Vref*a, Vref*b, etc.

A particular comparator will be selected based upon the level of the voltage sense output 507. Once actuated, the comparator will turn on a corresponding current switching transistor 514,515,516. The particular current switch transistor then couples the charging current through a current sensing resistor 517, 518, 519. The resultant current then flows through the cell 520.

The current is regulated by the current regulator 521, which in turn provides feedback to the pass element 502 to reduce or increase current accordingly. This is accomplished by comparing the voltage generated by current flowing through the current sensing resistors 517,518,519 to a reference by way of the current regulator 521. The values of the current sensing resistors 517, 518, 519, will of course have different values, each corresponding to a different level of current that should be allowed by the current regulator 521. The current regulator 521 then couples feedback to the pass element 502 to reduce current when the pass element 502 is in a danger zone. In this manner, the circuit facilitates charging at a constant power level (with respect to the pass element 502) by reducing current based upon the voltage across the pass element 502. The circuit is actuated in the danger zones, where Vce*ichg is too large.

Note that the current regulator 521 is essentially dominantly, analog "OR" coupled with a conventional linear regulator 522. The OR connection 523 allows the current regulator to override the conventional linear regulator 522 when the pass element 502 is in a danger zone. At other, safe operating ranges, the pass element 502 is allowed to remain saturated to allow maximum charge current to flow in accordance with the conventional linear regulator 522.

By way of example, the circuit was constructed in the lab to charge a single cell lithium battery having a termination voltage of 4.0 volts. The threshold junction temperature was set at 150 degrees C. and the maximum ambient was set at 50 degrees C. Typical power supplies found in electronics stores range from 7 to 25 volts, so these were presumed as realistic limits on input voltage. For a maximum pass element power dissipation of 600 mW, and a tolerance resolution of 15%, a total of 13 comparators and current switch transistors were employed. The component values and input values are shown in Table 1. It should be noted that the "Current Sense Resistor" corresponds to elements 517, 518, 519 in FIG. 5, and the Voltage Set Resistors corrrespond to the resistor dividers coupled to the comparators 508, 509, 510, respectively. R1 is coupled to the reference voltage and R2 is coupled to ground. The cell voltage is 4.0 volts.

Figure 7:
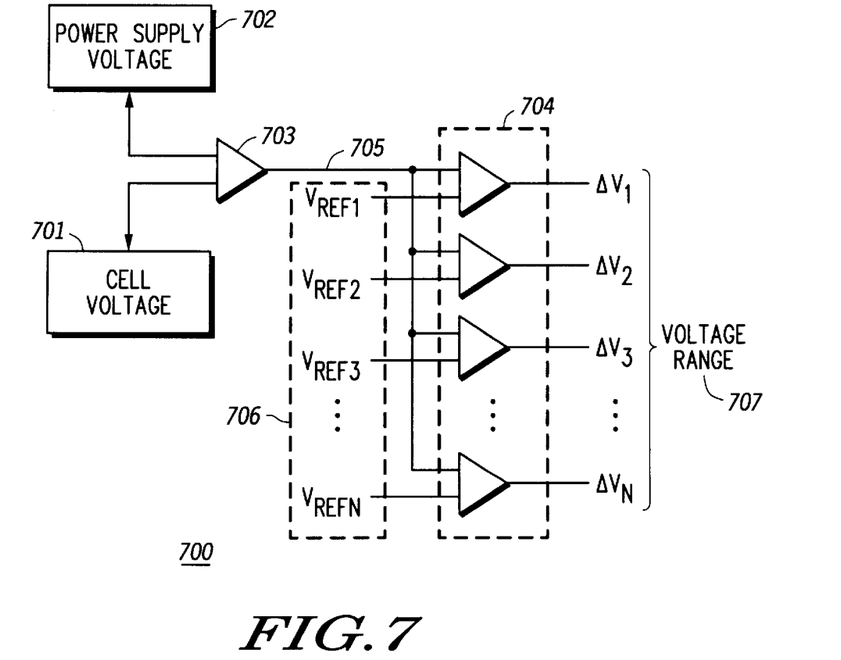
FIG. 7 is an alternate embodiment of a voltage sensing circuit in accordance with the invention.

Turning now to FIG. 7, one such alternative embodiment will be described. In FIG. 7, a circuit 700 that computes the difference between cell voltage 701 and the power supply voltage 702 completes the voltage sensing function. Recall from the discussion above that danger zones can occur when the power supply voltage 702 is much greater than the cell voltage 701. Here, a comparator 703 generates a signal 705 proportional to the difference between the power supply voltage 702 and the cell voltage 701. This signal 705 is coupled to a plurality of comparators 704, each having a corresponding reference voltage 706. In this manner, the plurality of comparators 704 selects a voltage range 707.

Figure 8:
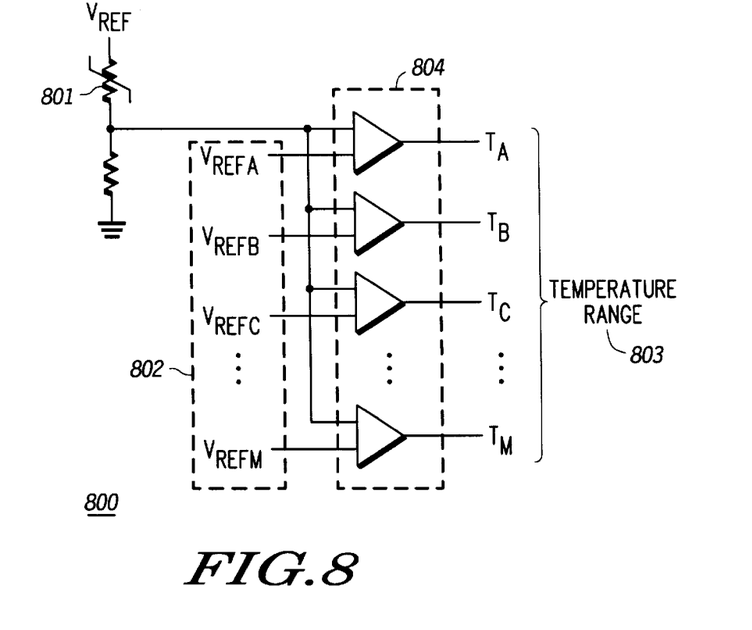
FIG. 8 is one embodiment of a temperature sensing circuit in accordance with the invention.

Referring now to FIG. 8, illustrated therein is an analogous circuit 800 for sensing temperature. In this circuit 800, a thermistor 801 generates a voltage that is compared to a plurality of references 802. Just as a plurality of comparators creates a voltage range in FIG. 7, here, a plurality of comparators 804 generates a temperature range 803.

Figure 9:
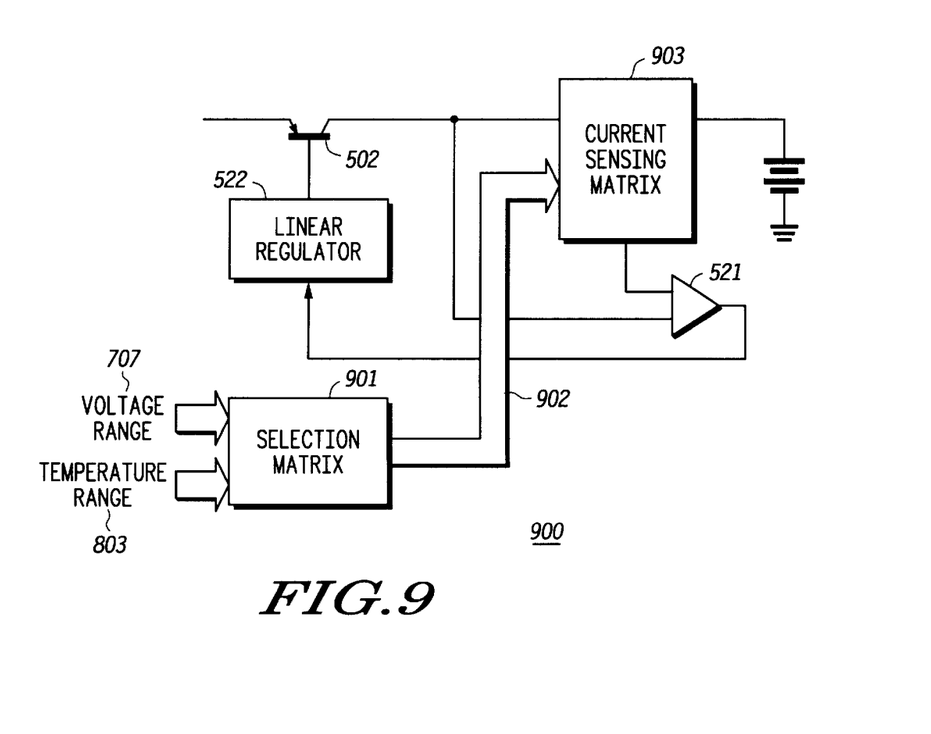
FIG. 9 is a block diagram of an alternate embodiment in accordance with the invention.

Referring now to FIG. 9, the temperature range 803 and voltage range 707 may then be coupled into a selection matrix 901. The selection matrix 901 may comprise analog circuitry, programmable logic, a memory look-up table, or

TABLE 1

| Comparator | Power Supply Voltage | Vce | Ichg (mA) | Pass element power (mW) | Current sense resistor | Voltage Set Resistor R1 | Voltage Set Resistor R2 |
| --- | --- | --- | --- | --- | --- | --- | --- |
|  | 0.00 | 0.00 | 0.00 | 0.00 |  |  |  |
| 1 | 7.00 | 3.00 | 0.20 | 600 | 3.33 | 1000 | 136 |
| 1 | 7.00 | 3.00 | 0.17 | 510 | 3.33 | 1000 | 136 |
| 2 | 7.53 | 3.52 | 0.17 | 600 | 3.92 | 1000 | 164 |
| 2 | 7.53 | 3.52 | 0.15 | 510 | 3.92 | 1000 | 164 |
| 3 | 8.15 | 4.15 | 0.15 | 600 | 4.61 | 1000 | 199 |
| 3 | 8.15 | 4.15 | 0.122 | 510 | 4.61 | 1000 | 199 |
| 4 | 8.89 | 4.88 | 0.122 | 600 | 5.42 | 1000 | 243 |
| 4 | 8.89 | 4.88 | 0.104 | 510 | 5.42 | 1000 | 243 |
| 5 | 9.75 | 5.75 | 0.104 | 600 | 6.38 | 1000 | 299 |
| 5 | 9.75 | 5.75 | 0.088 | 510 | 6.38 | 1000 | 299 |
| 6 | 10.76 | 6.76 | 0.088 | 600 | 7.51 | 1000 | 371 |
| 6 | 10.76 | 6.76 | 0.075 | 510 | 7.51 | 1000 | 371 |
| 7 | 11.96 | 7.95 | 0.075 | 600 | 8.83 | 1000 | 467 |
| 7 | 11.96 | 7.95 | 0.064 | 510 | 8.83 | 1000 | 467 |
| 8 | 13.36 | 9.35 | 0.064 | 600 | 10.39 | 1000 | 598 |
| 8 | 13.36 | 9.35 | 0.054 | 510 | 10.39 | 1000 | 598 |
| 9 | 15.01 | 11.01 | 0.054 | 600 | 12.23 | 1000 | 787 |
| 9 | 15.01 | 11.01 | 0.046 | 510 | 12.23 | 1000 | 787 |
| 10 | 16.95 | 12.95 | 0.046 | 600 | 14.39 | 1000 | 1075 |
| 10 | 16.95 | 12.95 | 0.039 | 510 | 14.39 | 1000 | 1075 |
| 11 | 19.24 | 15.24 | 0.039 | 600 | 16.93 | 1000 | 1562 |
| 11 | 19.24 | 15.24 | 0.033 | 510 | 16.93 | 1000 | 1562 |
| 12 | 21.93 | 17.93 | 0.033 | 600 | 19.22 | 1000 | 2536 |
| 12 | 21.93 | 17.93 | 0.028 | 510 | 19.22 | 1000 | 2536 |
| 13 | 25.09 | 21.09 | 0.028 | 600 | 23.51 | 1000 | 5402 |

Figure 6:
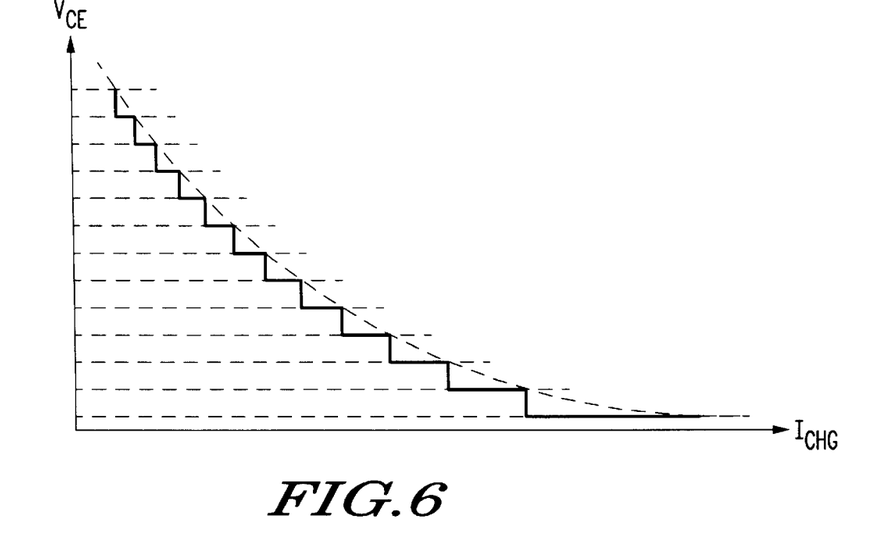
FIG. 6 is a piecewise, linear approximation of FIG. 4 in accordance with the invention.

When the circuit is actuated, the 13 comparators yield 13 different currents for 13 different Vce values, each effectively yielding a total power dissipation in the pass element of less than or equal to 600 mW. The circuit thus yields a piecewise linear approximation of the Vce versus Ichg curve shown in FIG. 4. This piecewise linear charging curve is shown in FIG. 6.

While the circuit of FIG. 5 is one preferred embodiment of a regulation circuit designed to keep a pass element at a constant power dissipation level during danger zones, it will be clear to those of ordinary skill in the art that the circuit is not so limited. Any number of equivalent circuits that account for voltage, current, ambient temperature and threshold junction temperature of a pass element would also suffice.

other equivalent device. The output 902 is then coupled to a current sensing matrix 903 to select the proper gain for the current regulator 521. The current regulator 521 is then coupled to a conventional regulator 502 to override the conventional regulator 522 when the pass element 502 is in a danger zone.

The invention could equally be carried out with a microprocessor having voltage, current and temperature. inputs. The microprocessor could then use a memory look-up table to select from a plurality of current limiting elements to set the proper gain for the current regulator, thereby ensuring the proper current during danger zone operation. The microprocessor could also solve EQN. 4 directly to select the proper current limiting element for the proper charge current to keep the pass element at a constant power dissipation level in the danger zones.

Figure 10:
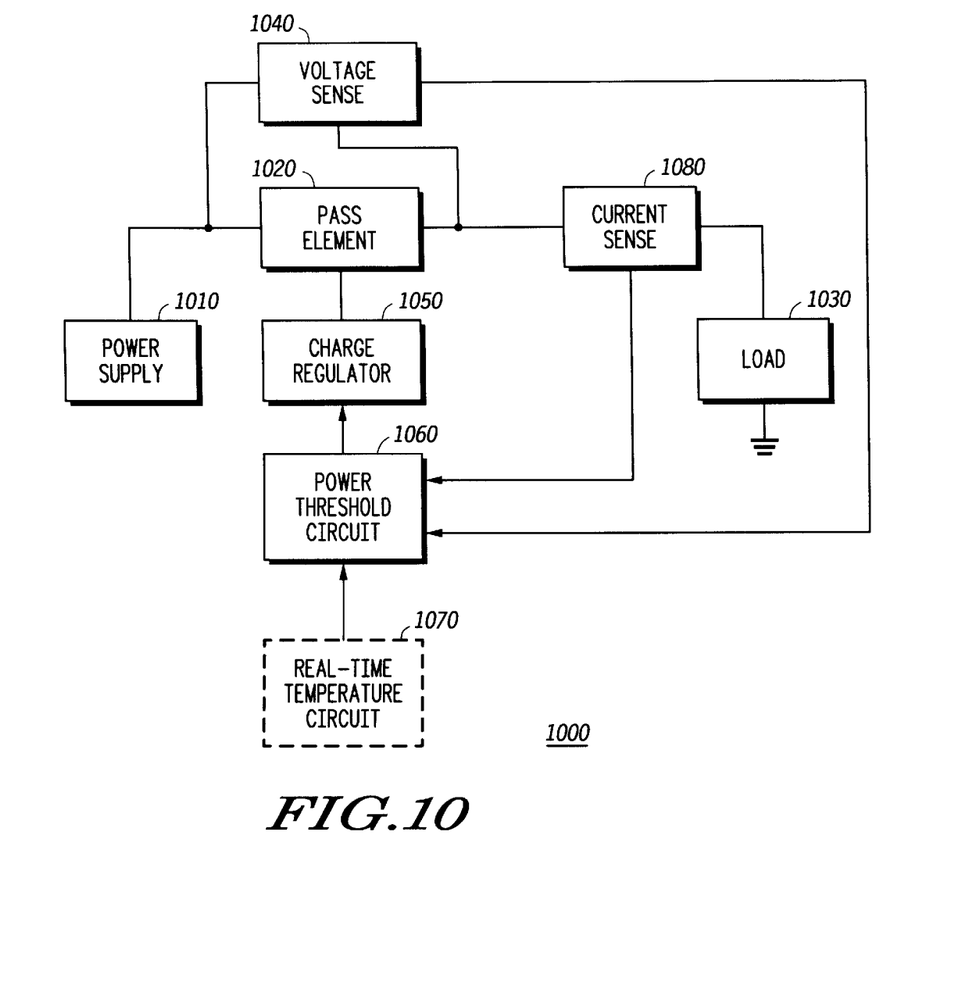
FIG. 10 is a schematic block diagram of a power management and temperature regulation circuit in accordance with the invention.

Referring now to FIG. 10, illustrated therein is a general embodiment 1000 of the invention. The general embodiment 1000 includes a power source 1010, pass element 1020 and load 1030 as herein described. A voltage sense circuit 1040 senses voltage across the pass element 1020. A current sense circuit 1050 senses current flowing through the pass element 1020 to the load 1030. A conventional charge regulator 1050 is provided for non-danger zone operation. A power threshold circuit 1060 is provided that receives the current sense and voltage sense. The power threshold circuit 1060 has stored internally a predetermined threshold junction temperature threshold. The power threshold circuit 1060 thus computes a current level sufficient to keep the power of the pass element 1020 constant during danger zone operation, and overrides the conventional charge regulator 1050 when necessary. If a predetermined maximum temperature is not desirable, a real time temperature sensor 1070 may optionally be coupled to the power threshold circuit 1060 as well.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while a preferred embodiment included a battery charging application, it will be clear that the circuit may be applied to any number of applications where power dissipating elements require threshold junction temperature protection.

What is claimed is:

1. A circuit for maintaining constant power dissipation in a series element, the circuit comprising:
    a. a power source;
    b. a load;
    c. at least one series element coupled serially between the power source and the load;
    d. a means for sensing a voltage across the series element;
    e. a parallel connection of a plurality of current sensing elements, the parallel connection being coupled serially between the power source and the load; and
    f. a means of selecting at least one of the plurality of current sensing elements,
       wherein the selection corresponds to a voltage sensed by the means for sensing voltage across the series element.

2. The circuit of claim 1, further comprising a means for providing a feedback signal to the series element, the feedback signal corresponding to the selection of one of the plurality of current sensing elements.

3. The circuit of claim 2, wherein the means for sensing the voltage across the series element comprises an amplifier having an output signal, the output signal being of a voltage that is proportional to the voltage across the series element.

4. The circuit of claim 3, wherein the means of selecting one of the plurality of current sensing elements comprises a plurality of comparators coupled to the output signal, each comparator having a corresponding reference voltage, such that the comparator is selected when the output signal exceeds the corresponding reference voltage.

5. The circuit of claim 4, wherein the means of selecting one of the plurality of current sensing elements selects at least one current sensing element such that the feedback signal to the series element causes power dissipated in the series element to remain below a predetermined threshold.

6. The circuit of claim 5, wherein the current sensing elements are selected from the group consisting of resistors, transformers, Hall effect sensors and transistors.

7. The circuit of claim 6, wherein the load comprises at least one rechargeable battery cell.

8. The circuit of claim 7, wherein the series element comprises a transistor.

9. The circuit of claim 8, wherein the predetermined threshold is the threshold junction temperature of the series element.

10. A circuit for maintaining constant power dissipation in a series element, the circuit comprising:
    a. a power source;
    b. a load;
    c. at least one series element coupled serially between the power source and the load, the series element:
       i. having at least a maximum operating temperature;
       ii. the series element being primarily controlled by a regulator circuit;
    d. a means for sensing voltage across the series element;
    e. a means for sensing current flowing through the series element; and
    f. a power threshold circuit, wherein the power threshold circuit overrides the regulator circuit to keep power constant when the product of sensed voltage and sensed current exceed a threshold corresponding to the maximum operating temperature of the series element.

11. The circuit of claim 10, further comprising a means for sensing temperature, the means for sensing temperature being coupled to the power threshold circuit.

12. The circuit of claim 11, wherein the wherein the power threshold circuit overrides the regulator circuit to keep power constant when the product of sensed voltage and sensed current, in sum with the sensed temperature, exceed a threshold corresponding to the maximum operating temperature of the series element.

13. The circuit of claim 12, wherein the power threshold circuit causes current flowing in the series element to be reduced when the product of sensed voltage and sensed current, in sum with the sensed temperature, exceed a threshold corresponding to the maximum operating temperature of the series element.

14. The circuit of claim 13, wherein the means of sensing voltage comprises an analog amplifier responsive to the difference between a voltage of a voltage of the power source and a voltage of the load.

15. The circuit of claim 14, wherein the means for sensing current comprises a parallel connection of a plurality of current sensing elements.

16. The circuit of claim 15, wherein the power threshold circuit comprises a microprocessor.

* * * * *